2 Sheets—Sheet 1.

C. B. TURNER.

Car Brake.

No. 1,784.

Reissued Oct. 4, 1864.

Witnesses:

David Lydig

R. Mellgin

Alfred Berney

Assignee.

AM. PHOTO-LITHO. CO. N.Y. (OSBORNE'S PROCESS)

2 Sheets—Sheet 2.

C. B. TURNER.

Car Brake.

No. 1,784.

Reissued Oct. 4. 1864.

Witnesses:

David Lydig

R. Lydig Jr.

Alfred Berney

Assignee.

AM. PHOTO-LITHO. CO. N.Y. (OSBORNE'S PROCESS.)

UNITED STATES PATENT OFFICE.

ALFRED BERNEY, OF JERSEY CITY, NEW JERSEY, ASSIGNEE, BY MESNE ASSIGNMENTS, OF CHARLES B. TURNER.

IMPROVEMENT IN OPERATING BRAKES FOR RAILROAD-CARS.

Specification forming part of Letters Patent No. 5,918, dated November 14, 1848; extended November 14, 1862; Reissue No. 1,784, dated October 4, 1864.

DIVISION A.

*To all whom it may concern:*

Be it known that CHARLES B. TURNER, deceased, late of the city of Buffalo, in the county of Erie and State of New York, did in his life-time invent certain new and useful Improvements in Railroad-Car Brakes; and I do hereby declare that the following, taken in connection with the drawings, is a full, clear, and exact description thereof.

Figure 1:
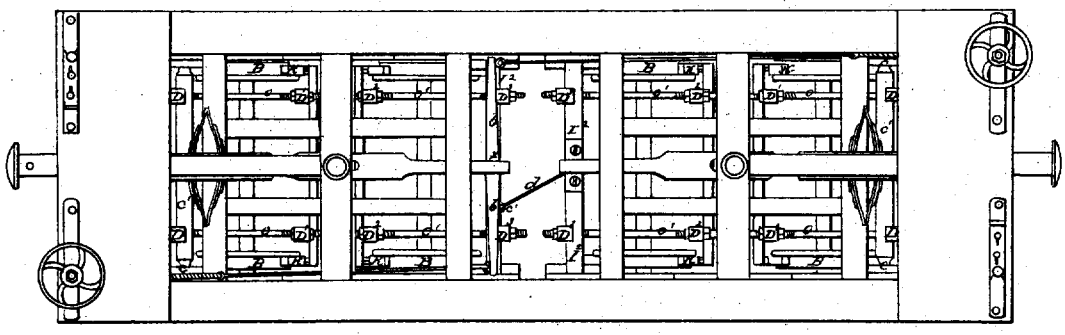
Figure 2:
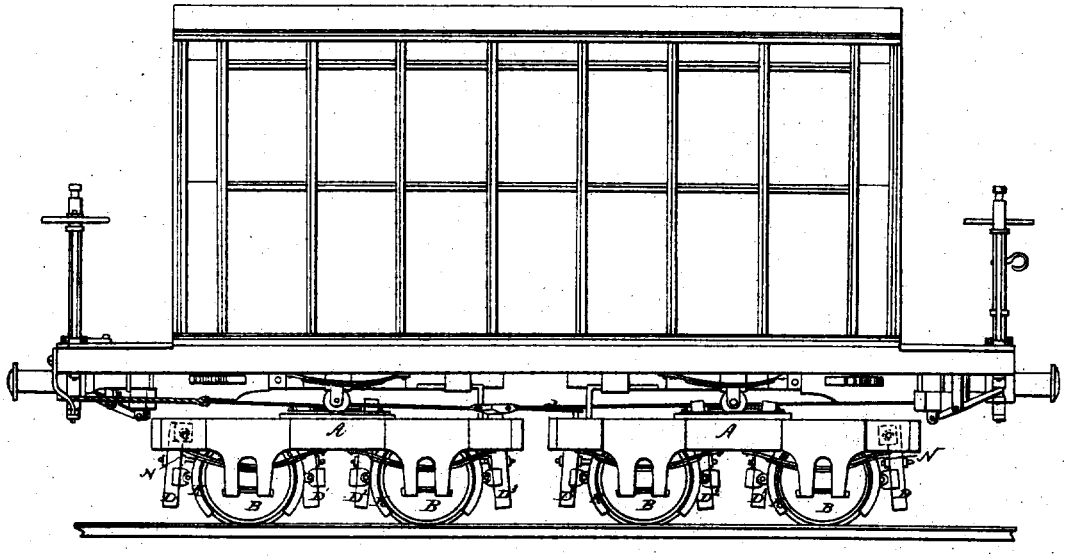
Figure 3:
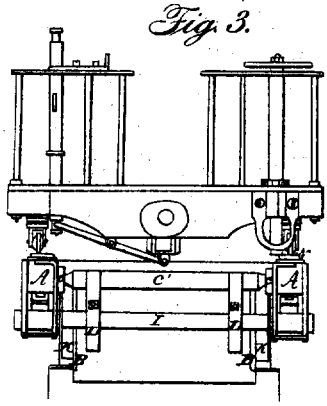
Figure 4:
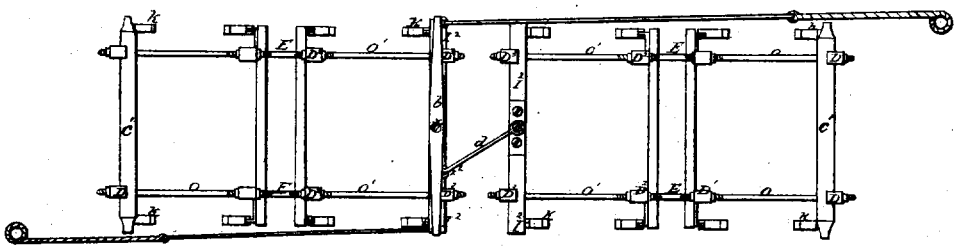
Figure 5:
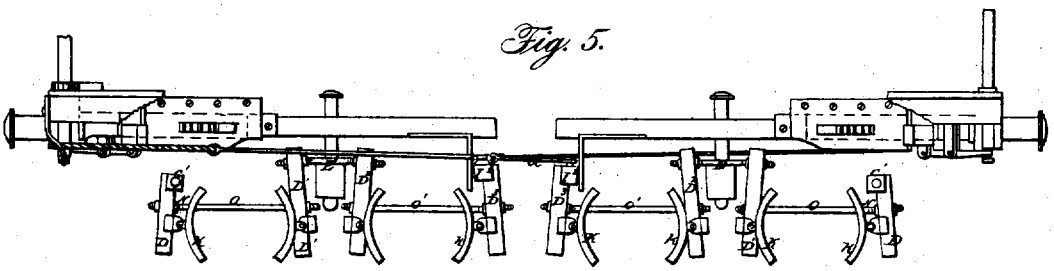
Figure 6:
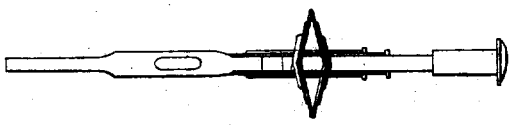
Figure 7:
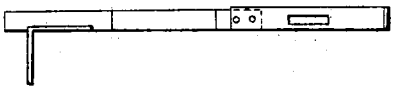
Figure 8:
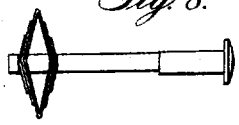
Figure 9:
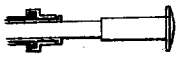

In the drawings, which represent the invention as embodied in a practical form, Figure 1 is a plan or top view of a car with the body thereof removed. Fig. 2 is a side elevation of the car. Fig. 3 is an end elevation of the car with the body removed; and in all these figures the system of brakes invented by the aforesaid TURNER is represented. Fig. 4 is a plan of the system of brakes only; and Fig. 5 is a side elevation of the same, representing also parts of the platforms. Figs. 6, 7, 8, and 9 are detail views illustrating appliances for putting the brakes in operation by a force derived from the momentum of the cars.

The invention made by the said TURNER included a method of applying brakes by power derived from the momentum of the cars. That part of the invention, although illustrated in the drawings, will not be described or claimed herein, as it forms the subject-matter of another patent bearing even date herewith.

The first part of the invention herein described is a method of combining the brakes of two trucks in the same car in such manner that both of them may be applied by the action of one windlass, or its equivalent, and at the same time act upon the wheels with the force due to the arrangement of the levers, even though the trucks vary in their distance from each other or their relation to the car-body, or though the shoes or the joints in the train of mechanism be unequally worn; and as an arrangement was devised prior to this invention by which brakes in both trucks might be brought in operation by a single windlass, the gist of this part of the invention lies in the contrivance by which this power may be so applied to brakes in two trucks as to act always substantially in the same manner, notwithstanding the wear of brake-shoes and connection-joints or changes of position of the trucks in relation to each other or the car body or platform, and this part of the invention does not depend upon any special or particular brake system in either truck, but applies solely to the method of connecting the brakes of the two trucks of one car so that they may be put in operation at the same time by a single windlass under the mode of operation herein set forth.

The invention relates, secondly, to a relative arrangement of levers and connecting-rods by which a nearly equal pressure may be applied by each one of eight brake-rubbers or to four rubbers on the same side of a car where power is applied to one end of the system, said arrangement being such as to compensate for inequalities of wear, and being useful not only on this account, but also for the reason that practice has developed the fact that brakes act most efficiently when the pressure exerted by each and every one of them is nearly equal.

In the drawings the trucks are represented at A A, the wheels at B B, and the brake-shoes at K K, and in the mode of application represented in the drawings there are two shoes to each wheel. At one end of each of the trucks are pivoted, at *c*, by means of a cross-bar or rock-shaft, *c'*, two levers, D D, united near their bottoms by a cross-bar, I. These levers are, by means of rods *o o*, (provided with adjusting-screws and nuts and joints at N N, or other provision for permitting the levers to swing upon the rods,) attached to other levers, D' D', united to each other by proper cross-bars. These levers D' D' are attached near their ends by rods E E (fitted like those before described) to the corresponding parts of another pair of levers, $D^2 D^2$, which are also fitted with cross-bars. These levers $D^2 D^2$ are attached by rods *o' o'* (fitted like the rods *o o*) to a fourth pair of levers, $D^3 D^3$, connected in like manner by cross-bars, and also having attached to their upper bar, $I^2$, a rod, *d*, or other suitable appliance, for transmitting motion or applying power to the whole system. The rods E E rest upon beams projecting from the truck-framing, and the cross-bar $I^2$ rests upon brackets bolted upon the inside of the trucks, and these projecting beams and brackets and the pivots at *c c* support the whole system, their office being to support the weight, while, at the same time, the projecting beams and brackets permit the bars $I^2$ and the connecting-rods E E to move when force is applied to the system. To each one of the levers is attached, in any suitable or proper manner—such as by ears and pivots, as shown in the drawings—a brake-shoe, as at K K K. The system in each truck is a duplicate of that in the other, and it is clear that one of each pair of levers D D, D′ D′, &c., is a duplicate of its fellow, and that they act substantially as a single lever.

By observation of the drawings it will be perceived that the levers are connected by rods, substantially at corresponding points—that is to say, D and D′ are connected by a rod applied nearly to the center of each, that D′ and $D^2$ are connected by rods applied nearly to the end of each, &c.—and that when power is applied to $I^2$, on the ends of the levers that complete the system, then the pressure upon each of the eight rubbers will be nearly equalized, the equalization being imperfect, partly on account of the comparative shortness of the upper ends of the levers D D, and partly by reason of the unavoidable spring and friction of the parts. When power is applied to the system, the pair of rubbers (on opposite sides of the truck) which happen to move with least friction will be brought into action; when they touch the wheels another pair will be brought up, and so on in succession till all eight bear upon their rubbing-points, and their usual mode of operation will be as follows: When power is applied to $I^2$ to draw the levers $D^3$ $D^3$ away from the rest of the system, the rubbers attached to those levers will touch their bearing-points on the wheels and become fulcra. The levers $D^3$ $D^3$ will then, through the rods *o′ o′*, cause the levers $D^2$ $D^2$ to oscillate and bring to bear the rubbers attached to them. These will now become fulcra, and when they do so the rods E E will move the levers D′ D′, causing the brakes attached to them to become fulcra, and then the rods *o o* will move the levers D D, causing them to press the shoes or rubbers attached to them upon the wheels.

Now, if the joints in rod *o′* or the shoes attached to the levers $D^3$ $D^3$ be worn more than their proper proportion, the only effect produced will be that $I^2$ will have to oscillate farther to bring the shoes into action; but when all the rubbers are in action each one will bear upon the wheel with substantially the same force as it would if there were no unequal wear, the only reason preventing perfect similarity of action with equally and unequally worn connections being that unequal wear will cause a slight difference in the relative angular position of the levers. As before stated, the levers and rods on each side of the car are duplicates and it is clear that the effect due to the connection of the levers and rods would be the same if the cross-bars were cut in two and each system on each side of the car were independent.

When the systems on opposite sides are connected as represented, then unequal wear of corresponding parts on opposite sides will be compensated by the torsion or bending of the cross-bars.

Only one illustration of the effect of unequal wear is described, but those acquainted with the subject will perceive that any elongation of the connections from unequal wear within reasonable practical limits, and alteration of fulcra from similar wear of the shoes, will not practically alter the operation of the system, and this result arises from the fact that there is but one fast point in the system, each lever, or, more properly, each pair except the last being movable at the shoe and at both of the points where they are connected with other levers of the system.

The brakes in each truck might be acted upon each by their own windlass or by connections to a lever pivoted to the car-body, so that one windlass, acting upon the lever, would put the brakes of both trucks in operation, as has been done prior to this invention; but in the latter case, if one truck moved toward the lever its brakes would be operated imperfectly or not at all, or if the connection between the lever and the brakes in one truck was by wear elongated more than the other corresponding connection, then the brakes in that truck which had the longest connection would be partially or wholly inoperative, and the same results would follow from a wear of one system as a whole greater than the wear of the other system in the other truck. A remedy for these evils is found in the invention here described for connecting a system of brakes in each of the two trucks, so that both may be operated by means of a lever in connection with a windlass and with the systems in each truck, such lever having its three points of attachment all movable. This lever is represented at *b* in the drawings. Its opposite ends are connected with a windlass at each end of the car by a rod and chain, as usual. At the point *x* it is connected by a bolt to a cross-bar, which connects it with the system of levers in one truck, and at the point *x′* it is connected by the rod *d* with the system of levers in the other truck, and inspection of the drawings will show that this lever is not fastened at any part to any point which is fixed with reference to or which is always at the same distance from the windlasses or either of them, and the operation will be as follows, if the system in the truck with which the rod *d* connects requires the least power to operate it.

When either windlass is operated, the lever *b* will turn at *x* and bring into operation that system of brakes connected to the lever by *d*, and when the shoes in that truck bear, then the point of attachment of *d* to the lever *b* will become fulcrum, and the lever moving in the same direction will, by means of the connection at $x'$, bring into operation the system of brakes in the other truck. If the rod $d$ or any connection between the lever $b$ and the rubbers in the truck with the system of which $d$ is connected be unduly elongated, then the lever $b$ will have to turn a little farther before the system operates, and the same result will follow if the truck supporting that system approaches the other truck. If the trucks separate or recede from each other the brakes will be brought into operation with a smaller amount of vibration of the lever; if they approach, the lever will have to vibrate farther; but whatever may be the elongation of connections or wear of shoes or proximity of trucks or position of trucks relative to the car-body, both systems must be brought into operation by the one windlass, unless the elongation of the connections or wear or change of position of trucks should be so great that the lever $b$ would have to lie in the same line as the connecting-rod before the shoes rub, and such an extent of deviation from the original construction could not happen in practice.

If the system to which the lever is connected at $x$ happens to move first, then, when its rubbers bear, $x$ will become fulcrum and the lever oscillating on it will cause the system in the other truck to be operated through $d$. It is considered unnecessary to prove at length that no unequal wear within practical limits so as to elongate connections, no unequal wear of rubbers, and no change of position of the trucks relative to each other or to the platform of the car, usual in practice, will prevent both systems from being operated; nor is it considered necessary to demonstrate further that one system in one truck can not be brought into action, leaving the other out of action; nor is it considered necessary to give reasons showing that the force, considered as a whole, applied to the wheels in either truck, will remain substantially the same even when connections or shoes are unequally worn, provided equal power is in all cases applied to the windlass, mathematically exact sameness of force being impossible, owing to the varying angular positions of the connecting-lever.

It is deemed sufficient to assert these results of the invention to point out how to embody it in a practical form and to specify its characteristics, viz: That it consists in having a lever attached at one point by proper connections to a brake system in one truck, at another point in a similar manner to a brake system in another truck, and at a third point to a windlass, or equivalent, for exerting force by a chain or rods or suitable connection, the lever having no fixed point of attachment, or point of attachment which remains always at the same distance from the windlass, but oscillating, when in motion, upon its points of connection with either one or the other system of brakes, one of which always becomes its fulcrum when the lever is moved to put both systems of brakes in operation.

Two windlasses are shown in the drawings—one at each end of the car—but either will put both sets of brakes into operation, and two are used only for the sake of convenience, so that power may be applied to the connecting-lever and the brakes of both trucks from either end of the car.

The invention herein described is susceptible of various modifications without changing the general principle on which it operates.

What is claimed herein as the invention of CHARLES B. TURNER, deceased, is—

1. The combination of these three elements, viz: a lever having the characteristics specified, two connections between said lever and two systems of brakes, and a connection between said lever and a windlass, the whole being combined and working together to produce results substantially such as are specified, under a mode of operation substantially as set forth.

2. The combination of four levers and their connecting-rods arranged with reference to each other, and operating substantially as specified, whereby pressure may be exerted on four rubbing-surfaces on the same side of a car, substantially in the manner and under the conditions hereinbefore described.

ALFRED BERNEY.

Witnesses:
DAVID LYDIG,
B. MULLIGAN.